(12) United States Patent
Czyszczon

(10) Patent No.: US 10,731,772 B2
(45) Date of Patent: Aug. 4, 2020

(54) PLUMBING FLOAT VALVE

(71) Applicant: Adam Czyszczon, Chicago, IL (US)

(72) Inventor: Adam Czyszczon, Chicago, IL (US)

( * ) Notice: Subject to any disclaimer, the term of this patent is extended or adjusted under 35 U.S.C. 154(b) by 133 days.

(21) Appl. No.: 16/137,468

(22) Filed: Sep. 20, 2018

(65) Prior Publication Data

US 2020/0096131 A1 Mar. 26, 2020

(51) Int. Cl.
  *F16K 31/22* (2006.01)
  *F16K 31/30* (2006.01)
  *F16K 21/18* (2006.01)

(52) U.S. Cl.
  CPC ............. *F16K 31/30* (2013.01); *F16K 31/22* (2013.01); *F16K 21/18* (2013.01)

(58) Field of Classification Search
  CPC ........ F16K 21/18; F16K 15/03; F16K 24/048; F16K 24/042; F16K 31/20; F16K 31/22; F16K 31/34; F16L 37/38; F16L 37/46; F16L 55/07; F16L 55/1018; Y10T 137/053; Y10T 137/7358; Y10T 137/7439; Y10T 137/7442; Y10T 137/7462; Y10T 137/7465; Y10T 137/7468; Y10T 137/7485
  See application file for complete search history.

(56) References Cited

U.S. PATENT DOCUMENTS

| | | | | |
|---|---|---|---|---|
| 1,704,226 A | * | 3/1929 | Spickler | A01K 7/04 137/437 |
| 2001/0023705 A1 | * | 9/2001 | Coscarella | F16K 15/03 137/269.5 |
| 2017/0066538 A1 | * | 3/2017 | Kawano | B64D 25/00 |

* cited by examiner

*Primary Examiner* — Hailey K. Do
(74) *Attorney, Agent, or Firm* — Au LLC; Adam E. Urbanczyk

(57) ABSTRACT

A plumbing float valve is provided that includes: (i) a flexible stopper; (ii) a float portion; (iii) a gate; (iv) a gate mounting assembly; and (v) a hinge. The flexible stopper is configured to seal a pipe. The float portion is configured to float on water. The gate is configured to couple the rubber stopper on one side and the float portion on another side. The gate mounting assembly includes: (i) a pivot; (ii) a movable arm; and (iii) one or more latches. The movable arm is configured to rotate about the pivot, and the one or more latches are configured to prevent movement of the movable arm about the pivot. The hinge of the plumbing float valve couples the gate to the gate mounting assembly.

12 Claims, 7 Drawing Sheets

PLUMBING FLOAT VALVE

BACKGROUND

Field of the Invention

The present invention generally relates to a valve and more particularly to a float valve for plumbing purposes.

Description of the Related Art

A well-built sewer and water transportation system is essential for residential, commercial, and industries properties to remain functional and hygienic. Occasionally, due to natural calamities like heavy rains, floods or the like, a situation may arise where sewer systems are overwhelmed, and their contents are forced back through sewer outlet pipes and into homes and other buildings. This back flow has the potential to create vast damage to building interiors and superstructures. Sewer outlet pipes may have valves which may manually be closed in expectation of excessive environmental precipitation or catastrophe. Likewise, electronic or electronically-automated systems may perform the same function, albeit subject to heightened expense and maintenance and potentially-reduced reliability.

Accordingly, there remains a need for an apparatus that is in the form of a float valve, which is neither manually operated nor electronically operated, but is reliability, and automatically, capable of preventing back-flow of water into a sewer pipe.

BRIEF SUMMARY OF THE INVENTION

A plumbing float valve is provided. The plumbing float valve includes: (i) a water stopper; (ii) a float portion; (iii) a gate; (iv) a gate mounting assembly; and (v) a hinge. The gate is configured to couple the water stopper on one side and the float portion on another side. The gate mounting assembly includes: (i) a pivot; (ii) a movable arm; and (iii) one or more latches. In another embodiment, the water stopper is made from a flexible material, and the flexible material is rubber. The float portion is made from a lightweight material and floats in water.

In an embodiment, the float valve mounts on a first pipe using the gate mounting assembly. The first pipe carries waste water from a house or a building to a catch basin. The water stopper is configured to seal the first pipe.

In yet another embodiment, the movable arm is configured to rotate about the pivot and the one or more latches are configured to prevent movement of the movable arm about the pivot. The hinge of the float valve couples the gate to the gate mounting assembly. The float portion substantially occupies the bottom of the gate to let the float valve rise sooner when the water level rises.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE INVENTION

Figure 1:
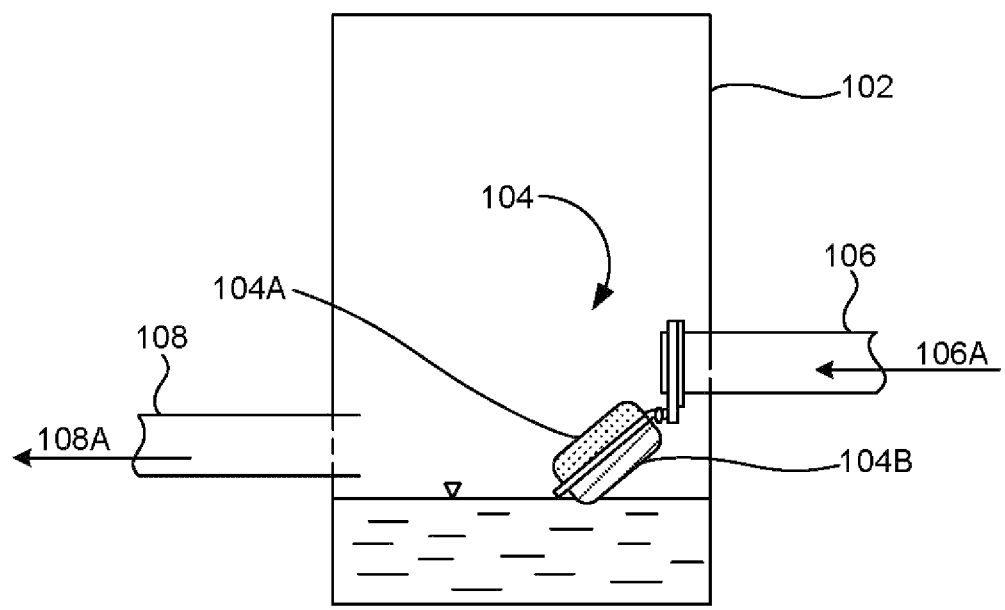
FIG. 1 is a side view of a catch basin according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an apparatus, in the form of a float valve, capable to prevent the back-flow of water by sealing the pipe. Referring now to the drawing where similar reference characters denote corresponding features consistently throughout the figures, there are shown preferred embodiments.

A plumbing float valve is provided that includes: (i) a rubber stopper; (ii) a float portion; (iii) a gate; (iv) a gate mounting assembly; and (v) a hinge. The rubber stopper is configured to seal a first pipe. The float portion is configured to float in water. The gate is configured to couple the rubber stopper on one side and the float portion on another side. The gate mounting assembly includes: (i) a pivot; (ii) a movable arm; and (iii) one or more latches. The movable arm is configured to rotate about the pivot, and the one or more latches are configured to prevent movement of the movable arm about the pivot. The hinge of the plumbing float valve couples the gate to the gate mounting assembly. In one embodiment, the plumbing float valve mounts on the first pipe using the gate mounting assembly, and the first pipe carries waste water from a house or a building to a catch basin.

FIG. 1 is a side view of a catch basin 102. The catch basin 102 includes a plumbing float valve 104, a first pipe 106, and a second pipe 108. The plumbing float valve 104 further includes a water stopper 104A, and a float portion 104B. The first pipe 106 carries waste water from a house or a building towards the catch basin 102. An arrow 106A shows the direction of flow of the waste water from the house or the building towards the catch basin 102. The second pipe 108 carries the waste water from the catch basin 102 towards sewer. An arrow 108A shows the direction of flow of the waste water from the catch basin 102 towards the sewer. The first pipe 106 is positioned above the second pipe 108. The waste water enters the catch basin 102 from the first pipe 106, and leaves the catch basin 102 from the second pipe 108. When blockage occurs at sewer, the waste water cannot evacuate, or flows back into, the catch basin 102 and the catch basin 102 fills. As the water level rises in the catch basin 102 and reaches the plumbing float valve 104, the float portion 104B of the plumbing float valve 104 starts to rise thereby allowing the water stopper 104A to seal the outlet of the first pipe 106.

Figure 2:
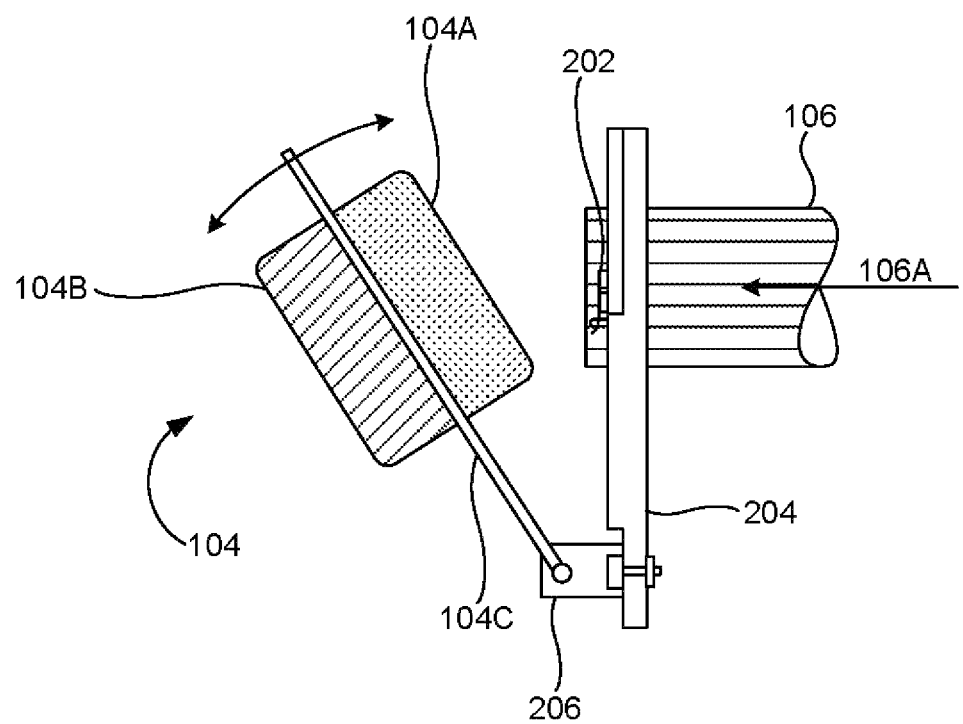
FIG. 2 is a side view of the arrangement of the plumbing float valve of FIG. 1 according to an embodiment herein.

FIG. 2 is a side view of the arrangement of the plumbing float valve 104 of FIG. 1. The plumbing float valve 104 further includes a gate 104C, a gate mounting assembly 204, and a hinge 206. The gate 104C couples the water stopper 104A on one side and the float portion 104B on another side. The arrangement shown in FIG. 2 further includes a latch 202. The first pipe 106 couples to the gate mounting assembly 204. The arrow 106A shows the direction of flow of the waste water from the house or the building towards the catch basin 102.

Figure 3A:
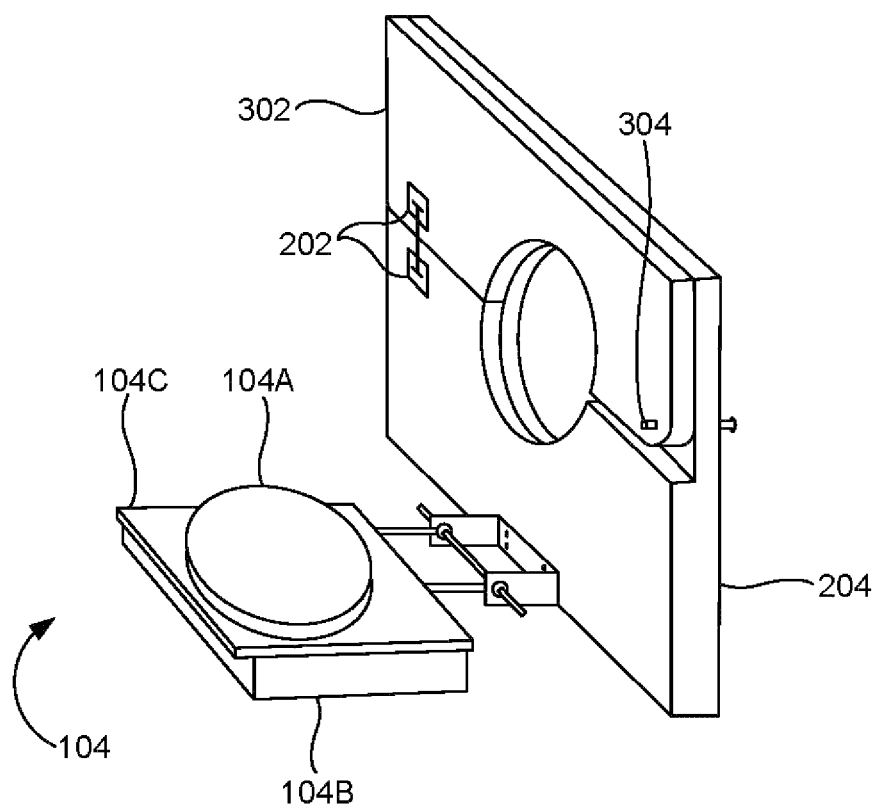
FIG. 3A is a perspective view of the arrangement of the plumbing float valve of FIG. 2 with the one or more latches in a locked position according to an embodiment herein.

FIG. 3A is a perspective view of the arrangement of the plumbing float valve 104 of FIG. 2 with the one or more latches 202 in a locked position according to an embodiment herein. The gate mounting assembly 204 of the plumbing float valve 104 includes a movable arm 302 and one or more latches 202. The movable arm 302 pivotally couples to the gate mounting assembly 204 using a pivot 304. The one or more latches 202 lock the movable arm 304 onto the gate mounting assembly 204. In one embodiment, the material for the water stopper 104A of the plumbing float valve 104 is water-resistant rubber, polymer, or other flexible material. The material for the float portion 104B of the plumbing float valve 104 may be stryofoam or other water-resistant material that is less-dense than liquid water.

Figure 3B:
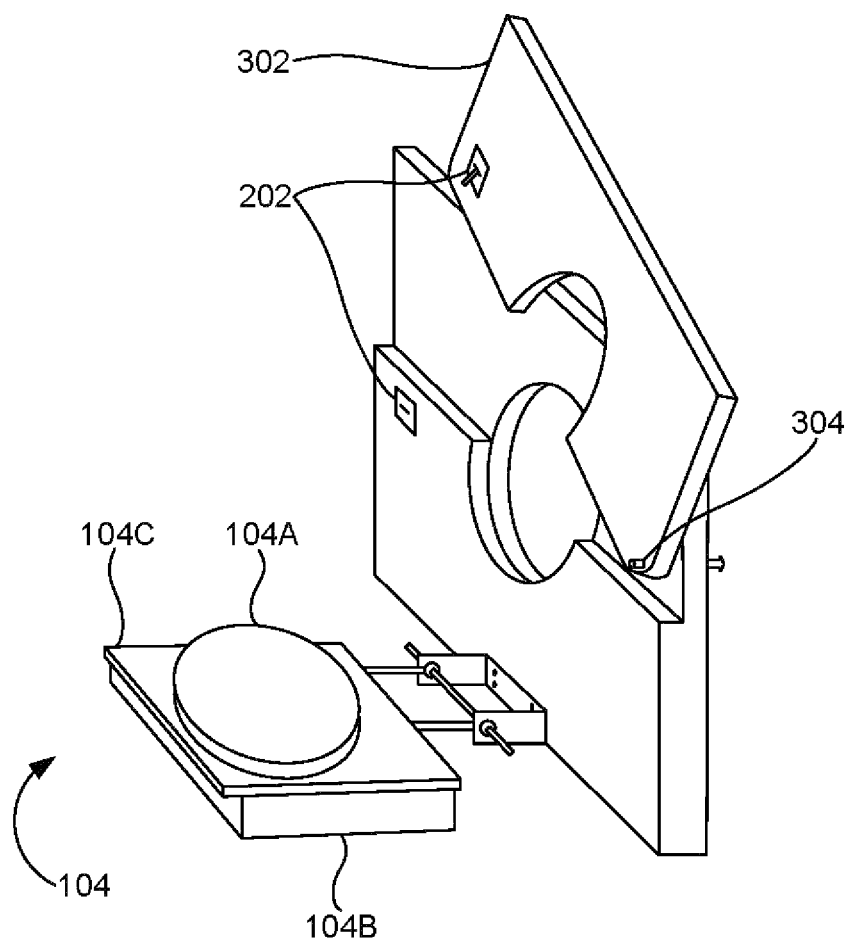
FIG. 3B is a perspective view of the arrangement of the plumbing float valve of FIG. 3A with the one or more latches in an unlocked position according to an embodiment herein.

FIG. 3B is a perspective view of the arrangement of the plumbing float valve 104 of FIG. 3A with the one or more latches 202 in an unlocked position according to an embodiment herein. The one or more latches 202 lock the movable arm 302 to restrict the pivotable movement of the movable arm 302 about the pivot 304. The movable arm 302 remains in a closed position. In one embodiment, the material for the water stopper 104A of the plumbing float valve 104 may be water-resistant rubber, or the like. In another embodiment, the float portion 104B of the plumbing float valve 104 may be hollow.

Figure 3C:
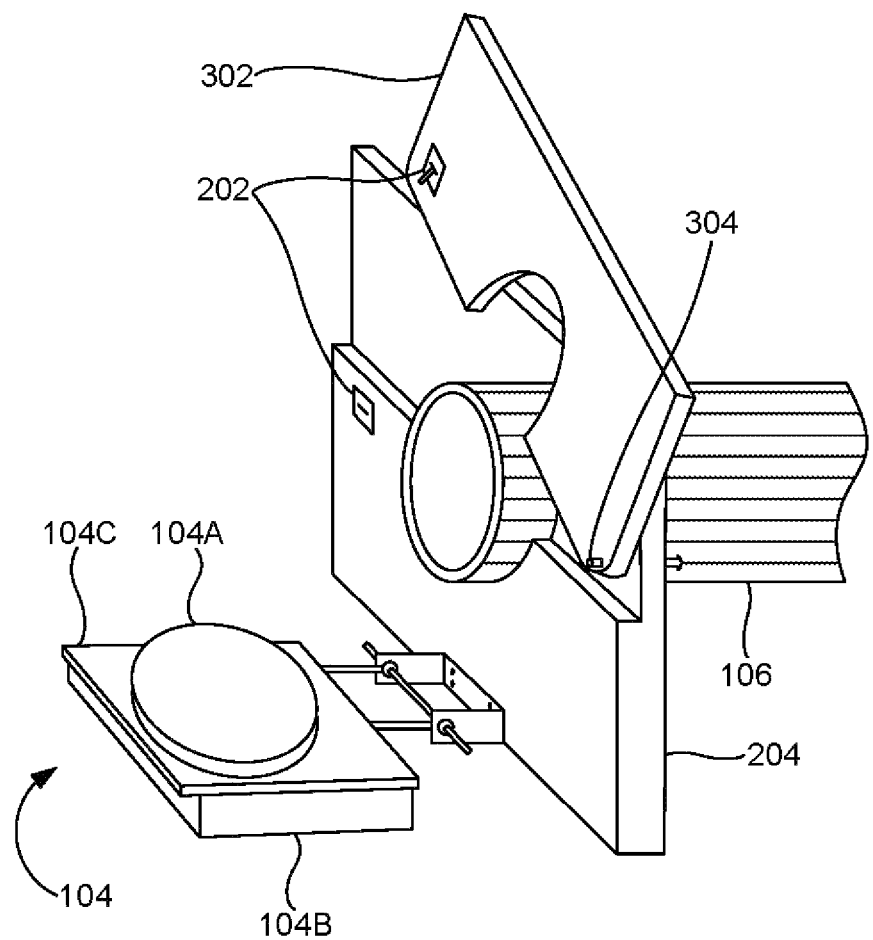
FIG. 3C is a perspective view of the arrangement of the plumbing float valve of FIG. 3B with the first pipe temporarily fitted according to an embodiment herein.

FIG. 3C is a perspective view of the arrangement of the plumbing float valve 104 of FIG. 3B with the first pipe 106 temporarily fitted according to an embodiment herein. The first pipe 106 fits in the gate mounting assembly 204 of the plumbing float valve 104 when a user unlocks the one or more latches 202 on the gate mounting assembly 204, thereby making the movable arm 302 free to pivotally move about the pivot 304. In another embodiment, a flexible gasket member may be disposed on to the surfaces of the moveable arm 302 and the 204 which are adapted to secure around the first pipe 106 to further secure the gate mounting assembly 204 onto the first pipe 106.

Figure 3D:
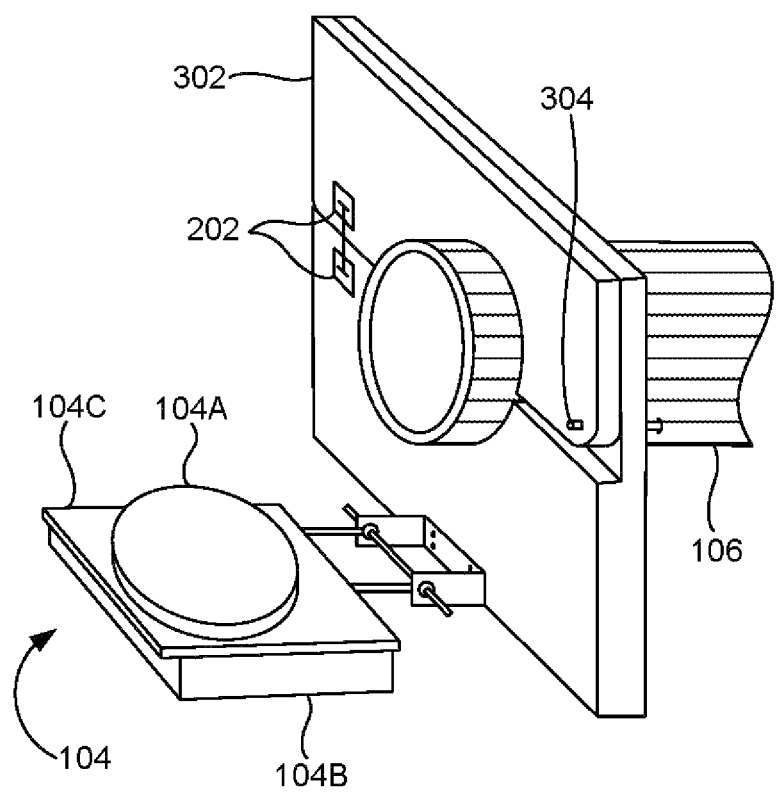
FIG. 3D is a perspective view of the arrangement of the plumbing float valve of FIG. 3B with the first pipe fixed according to an embodiment herein.

FIG. 3D is a perspective view of the arrangement of the plumbing float valve 104 of FIG. 3B with the first pipe 106 fixed according to an embodiment herein. The user locks the one or more latches 202 on the gate mounting assembly 204, thereby locking the movable arm 302, and hence the first pipe 106.

Figure 3E:
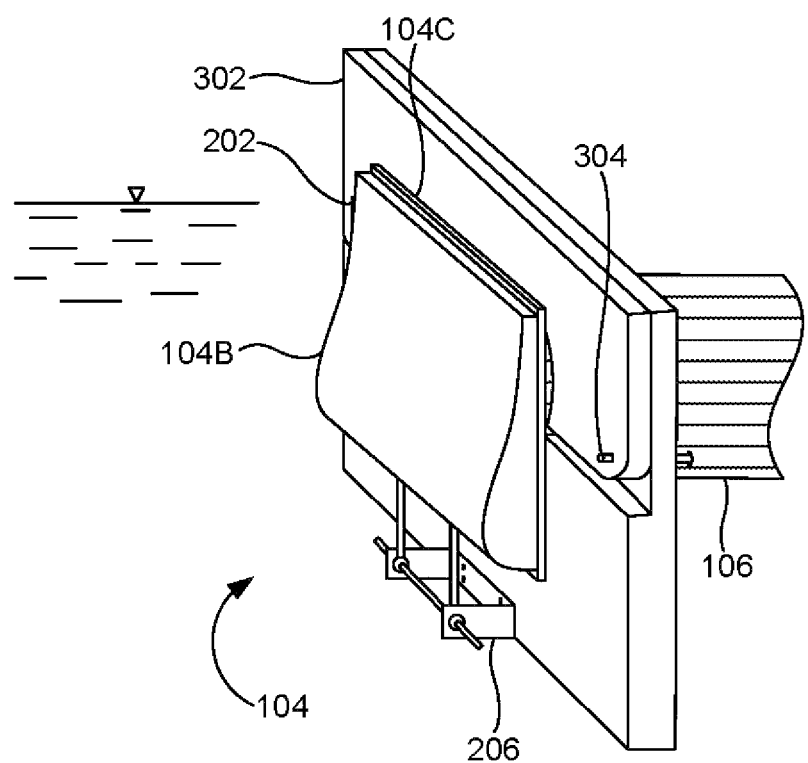
FIG. 3E is a perspective view of the arrangement of the plumbing float valve in an operational mode according to an embodiment herein.

FIG. 3E is a perspective view of the arrangement of the plumbing float valve 104 in an operational mode according to an embodiment herein. When the water rises above a desired limit, the float portion 104B of the plumbing float valve 104 raises the gate 104C pivotally about the hinge 206. The gate 104C pivotally moves towards the opening of the first pipe 106. At a certain height, the hydrostatic pressure exerted by the water will, along with the buoyant force experienced by the float portion, move the float valve 104 against and seal the first pipe 106 using the water stopper (shown in FIG. 3D as 104A).

The plumbing float valve prevents the back flow of the waste water from the sewer line or the catch basin into the main pipe that goes into the house or the building. The material of the water stopper being flexible, seals the opening of the first pipe completely to prevent any leakage and to avoid any flood-like situation. The water stopper is made from water-resistant rubber, polymer, composite, or other mater sufficiently flexible to create a seal against a pipe face yet durable enough to resist degrading in water, sediment, gaseous, and chemical environments of the type maintained in a swear system.

The float portion is light weight to increase the sensitivity and quick response to the rising water level to raise the plumbing float valve. The float portion may have a shape configured to more or less-quickly raise the float valve, e.g., by having most of the float portion's volume located near the bottom of the gate (shown in FIG. 3E). The float portion, which may be hollow, is made from Styrofoam, other polymer foam, polymer, or other water-resistant material that is less-dense than liquid water. The one or more latches on the gate mounting assembly and the movable arm lock the plumbing float valve onto the first pipe. The latches—which may be a deadbolt latch, spring latch, or any fastening mechanism to keep to the arm removably secured to the gate mounting assembly—gate, and gate mounting assembly are made from stainless steel, polymer, or other corrosion-resistant materials suitable for use in a sewer-like environment. The plumbing float valve in an operational mode maintains the hygienic environment in the house, building or the locality, and more specifically the basements of the house or the building.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

I claim:

1. A plumbing float valve comprising:
   a water stopper;
   a float portion;
   a gate, wherein said gate is configured to couple said water stopper on one side and said float portion on another side;

a gate mounting assembly coupled to a first pipe, wherein said gate mounting assembly comprises:
a pivot;
a movable arm comprising a plurality of surfaces;
at least one latch configured to lock the movable arm, wherein the first pipe carries wastewater into a catch basin, wherein the catch basin comprises a second pipe to facilitate the wastewater to leave from the catch basin, wherein the first pipe is positioned above the second pipe; and
a flexible gasket member disposed on to the plurality of surfaces of the moveable arm adapted to secure around the first pipe, wherein the gate pivotally moves towards an opening of the first pipe.

2. The plumbing float valve of claim 1, wherein said float portion is made from a material that is less dense than water.

3. The plumbing float valve of claim 1, wherein said gate mounting assembly is adapted to mount onto the first pipe.

4. The plumbing float valve of claim 1, wherein said water stopper is configured to seal the first pipe.

5. The plumbing float valve of claim 1, wherein said movable arm is configured to rotate about said pivot.

6. The plumbing float valve of claim 1, wherein said at least one latch is configured to prevent movement of said movable arm about said pivot.

7. The plumbing float valve of claim 1, comprises a hinge to couple said gate to said gate mounting assembly.

8. The plumbing float valve of claim 1, wherein said float portion substantially occupies a bottom of said gate.

9. The plumbing float valve of claim 1, wherein said water stopper is made from a flexible material.

10. The plumbing float valve of claim 9, wherein said flexible material is rubber.

11. A plumbing float valve comprising:
a rubber stopper, wherein said rubber stopper is configured to seal a first pipe;
a float portion, wherein said float portion is configured to float in water;
a gate, wherein said gate is configured to couple said rubber stopper on one side and said float portion on another side;
a gate mounting assembly coupled to the first pipe, wherein said gate mounting assembly comprises:
a pivot;
a movable arm comprising a plurality of surfaces, wherein said movable arm is configured to rotate about said pivot;
one or more latches configured to lock the movable arm, wherein said one or more latches are configured to prevent movement of said movable arm about said pivot, wherein the first pipe carries waste water into a catch basin, wherein the catch basin comprises a second pipe to facilitate the waste water to leave from the catch basin, wherein the first pipe is positioned above the second pipe; and
a flexible gasket member disposed on to the plurality of surfaces of the moveable arm adapted to secure around the first pipe, wherein the gate pivotally moves towards an opening of the first pipe.

12. The plumbing float valve of claim 11, wherein the gate mounting assembly is adapted to secure around the first pipe.

* * * * *